US011466996B2

(12) United States Patent
Tyuryutikov et al.

(10) Patent No.: US 11,466,996 B2
(45) Date of Patent: Oct. 11, 2022

(54) PATHFINDING THROUGH A ROAD NETWORK WITH TURN COMPLEXITIES

(71) Applicant: Verizon Patent and Licensing Inc., Arlington, VA (US)

(72) Inventors: Mykhaylo Tyuryutikov, Christchurch (NZ); Hughan Jay Ross, Christchurch (NZ); Mark A Fryer, Christchurch (NZ)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 470 days.

(21) Appl. No.: 16/373,753

(22) Filed: Apr. 3, 2019

(65) Prior Publication Data

US 2020/0318981 A1    Oct. 8, 2020

(51) Int. Cl.
*G01C 21/34* (2006.01)
*G01C 21/20* (2006.01)

(52) U.S. Cl.
CPC ......... *G01C 21/3461* (2013.01); *G01C 21/20* (2013.01)

(58) Field of Classification Search
CPC .... G01C 21/3461; G01C 21/20; G01C 21/24; G01C 21/26
See application file for complete search history.

(56) References Cited

U.S. PATENT DOCUMENTS

| | | | | |
|---|---|---|---|---|
| 5,272,638 A * | 12/1993 | Martin | ............... | G01C 21/3446 340/990 |
| 6,349,261 B1 * | 2/2002 | Ohnishi | .................. | G01C 21/34 340/995.19 |
| 7,079,943 B2 * | 7/2006 | Flann | ..................... | G05D 1/024 701/25 |
| 7,133,771 B1 * | 11/2006 | Nesbitt | .............. | G01C 21/3453 701/428 |
| 9,267,801 B2 * | 2/2016 | Gupta | ..................... | G01C 21/20 |
| 2005/0192749 A1 * | 9/2005 | Flann | ................... | A01B 69/008 701/410 |
| 2007/0156326 A1 * | 7/2007 | Nesbitt | .............. | G01C 21/3453 701/532 |
| 2010/0204912 A1 * | 8/2010 | Ros | ......................... | G01C 21/32 701/532 |

(Continued)

OTHER PUBLICATIONS

Geisberger et al. "Efficient Routing in Road Networks with Turn Costs". 2011. 12 pages. http://citeseerx.ist.psu.edu/viewdoc/download?doi=10.1.1.661.3226&rep=rep1&type=pdf.

(Continued)

*Primary Examiner* — Frederick M Brushaber

(57) ABSTRACT

A route planning platform can find a path through a road network that has turn complexities. The route planning platform can identify, in the road network, multiple paths from an origin node to a destination node, including at least one path having a turn complexity (e.g., a turn cost, a turn restriction, and/or the like). The route planning platform can compute a respective cost for each respective path from the origin node to the destination node based on a total cost associated with a set of road segments in the respective path, and the cost for the at least one path having the turn complexity can be further based on the turn cost or the turn restriction along the at least one path. The route planning platform can select, among the multiple paths, a shortest path based on the respective cost for each path.

20 Claims, 8 Drawing Sheets

(56) References Cited

U.S. PATENT DOCUMENTS

| | | | | |
|---|---|---|---|---|
| 2011/0137549 A1* | 6/2011 | Gupta | ............... | G01C 21/3476 |
| | | | | 701/533 |
| 2012/0016582 A1* | 1/2012 | Cerecke | ............ | G01C 21/3446 |
| | | | | 701/410 |
| 2012/0089920 A1* | 4/2012 | Eick | ..................... | G06T 11/206 |
| | | | | 715/739 |
| 2012/0158299 A1* | 6/2012 | Cerecke | ............ | G01C 21/3469 |
| | | | | 701/533 |
| 2016/0252355 A1* | 9/2016 | Mays | .................. | G01C 21/206 |
| | | | | 701/533 |
| 2017/0219353 A1* | 8/2017 | Alesiani | ............... | G05D 1/0212 |
| 2019/0120640 A1* | 4/2019 | Ho | ..................... | G01C 21/3461 |
| 2020/0025583 A1* | 1/2020 | Herlocker | ............ | G08G 1/0133 |
| 2020/0132482 A1* | 4/2020 | Beaurepaire | ....... | G01C 21/3461 |

OTHER PUBLICATIONS

Volker, Lars. "Route Planning in Road Networks with Turn Costs". Jul. 2008. 30 pages. http://lekv.de/pub/lv-turns-2008.pdf.

\* cited by examiner

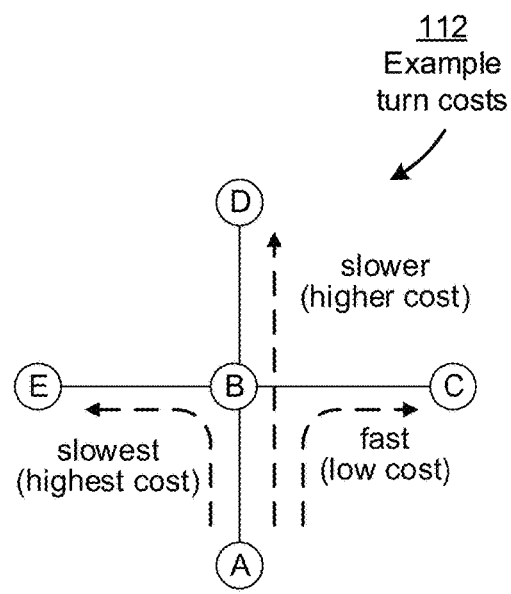
112
Example turn costs
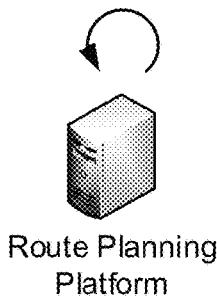
110
Model turn complexities in road network (e.g., turn costs, turn restrictions)
Route Planning Platform
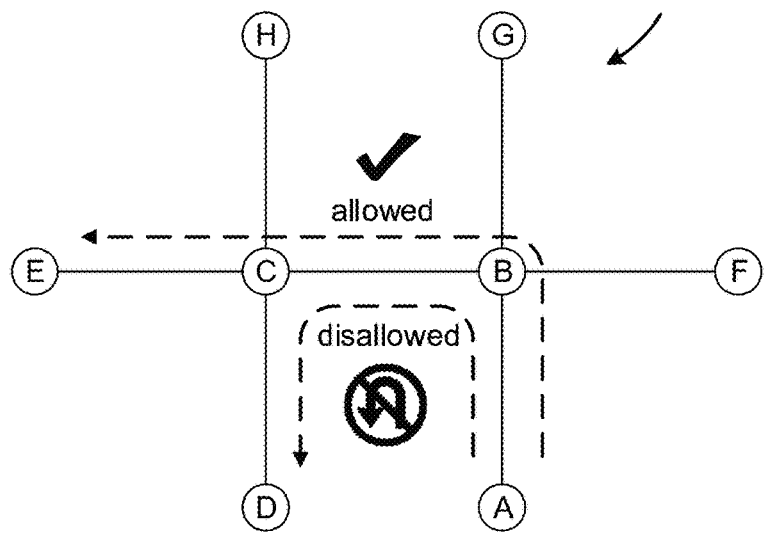
114
Example turn restrictions
FIG. 1A

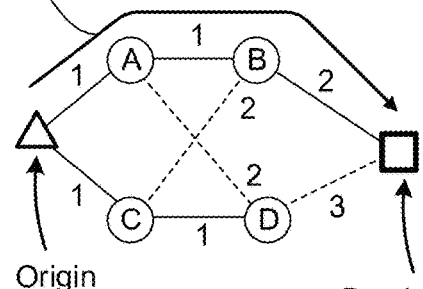
118
Example road network without turn complexities
Route Planning Platform
116
Find shortest path through road network based on turn complexities
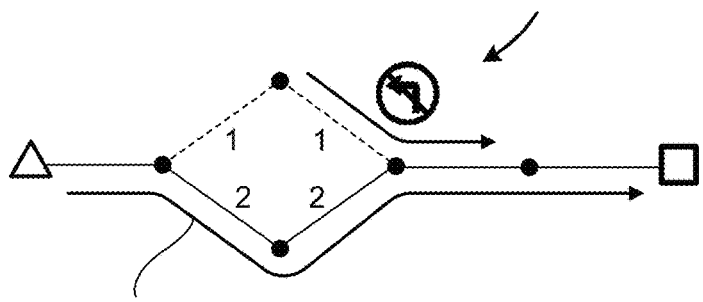
120
Example road network with left turn restriction
Select cheapest path that avoids left turn restriction
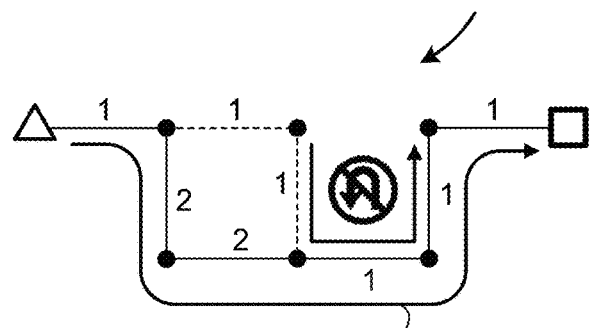
122
Example road network with U-turn restriction
Select cheapest path that avoids U-turn restriction
FIG. 1B

124
Identify subnetwork
including restricted area
Route Planning
Platform
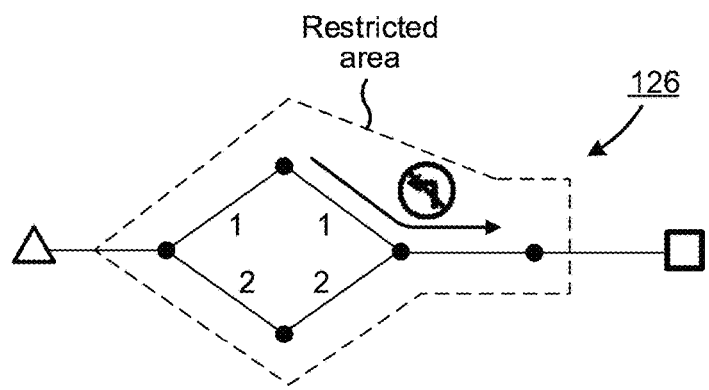
128
Find shortest paths
between border links
using exhaustive search
Route Planning
Platform
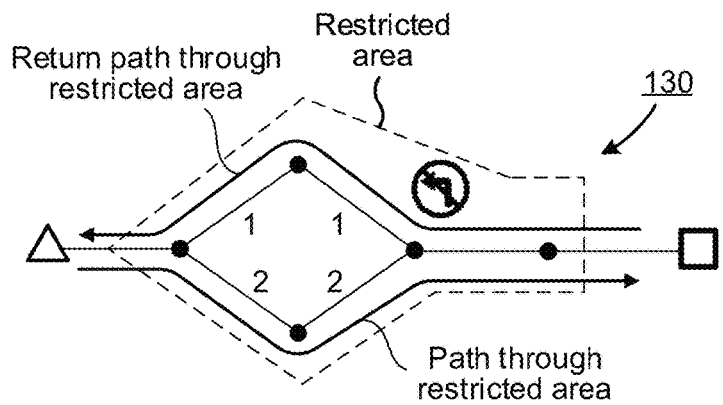
132
Replace subnetwork
with shortest paths
Route Planning
Platform
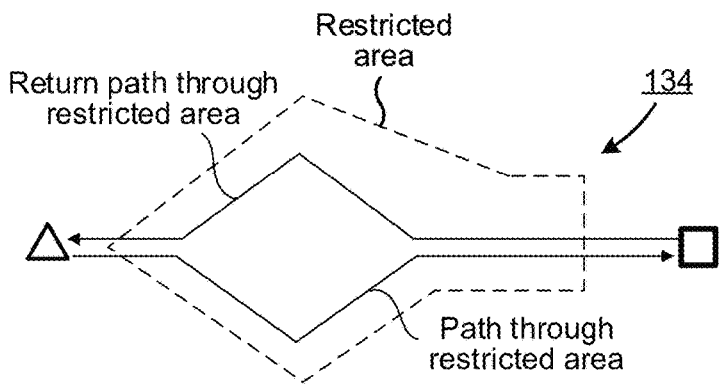
FIG. 1C

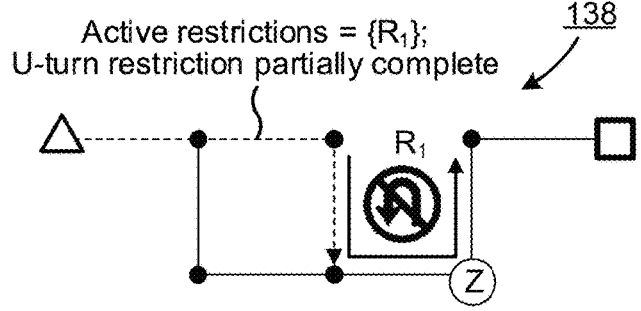
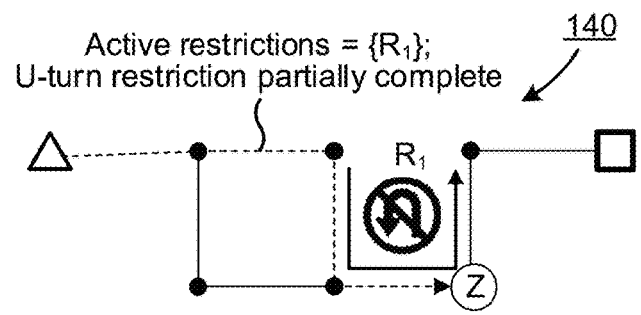
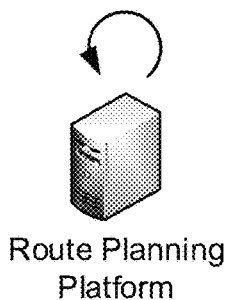
136
Determine active restrictions for paths that arrive at the same node
Route Planning Platform
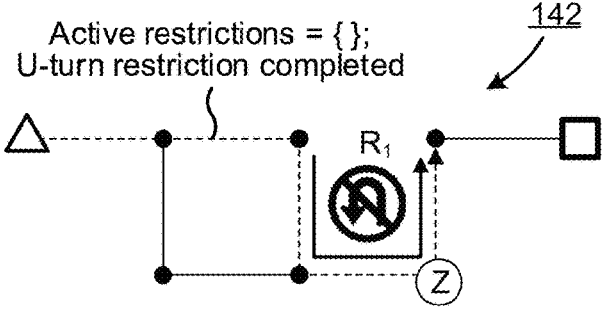
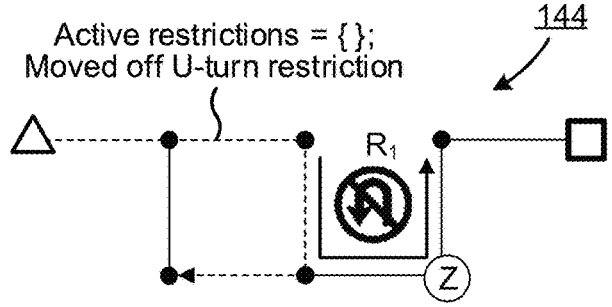
FIG. 1D

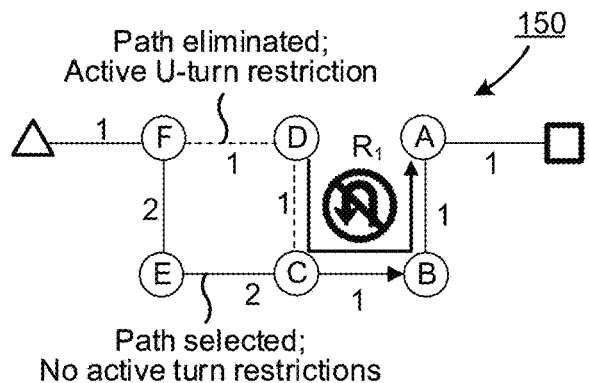
150
Path eliminated;
Active U-turn restriction
Path selected;
No active turn restrictions
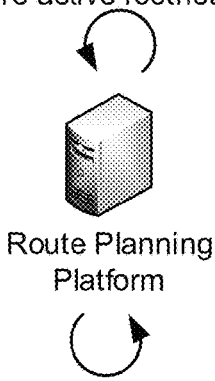
146
Eliminate path(s) that arrive at the same node through the same link with higher cost and more active restrictions
Route Planning Platform
148
Select shortest remaining path
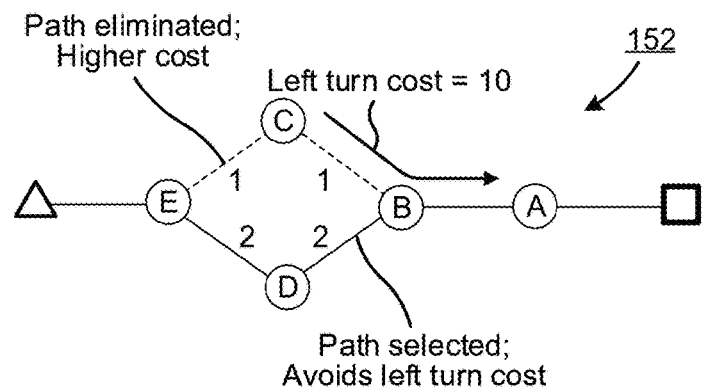
152
Path eliminated;
Higher cost
Left turn cost = 10
Path selected;
Avoids left turn cost
FIG. 1E

PATHFINDING THROUGH A ROAD NETWORK WITH TURN COMPLEXITIES

BACKGROUND

A road network, sometimes called a street network and/or the like, refers to a system of roads or streets that are interconnected through various junctions in a given area. Route planning in road networks is usually solved by computing an optimal path to travel between two or more given locations based on one or more optimization criteria (e.g., fastest, shortest, fewest changes, cheapest, and/or the like). For example, a road network can be represented or otherwise modeled using a graph in which junctions (e.g., intersections, interchanges, and/or the like) are mapped to nodes (or vertices) and road segments are mapped to links (or edges) that can be assigned a weight based on length, travel time, and/or the like.

BRIEF DESCRIPTION OF THE DRAWINGS

FIGS. 1A-1E are diagrams of one or more example implementations described herein.

DETAILED DESCRIPTION OF PREFERRED EMBODIMENTS

Figure 2:
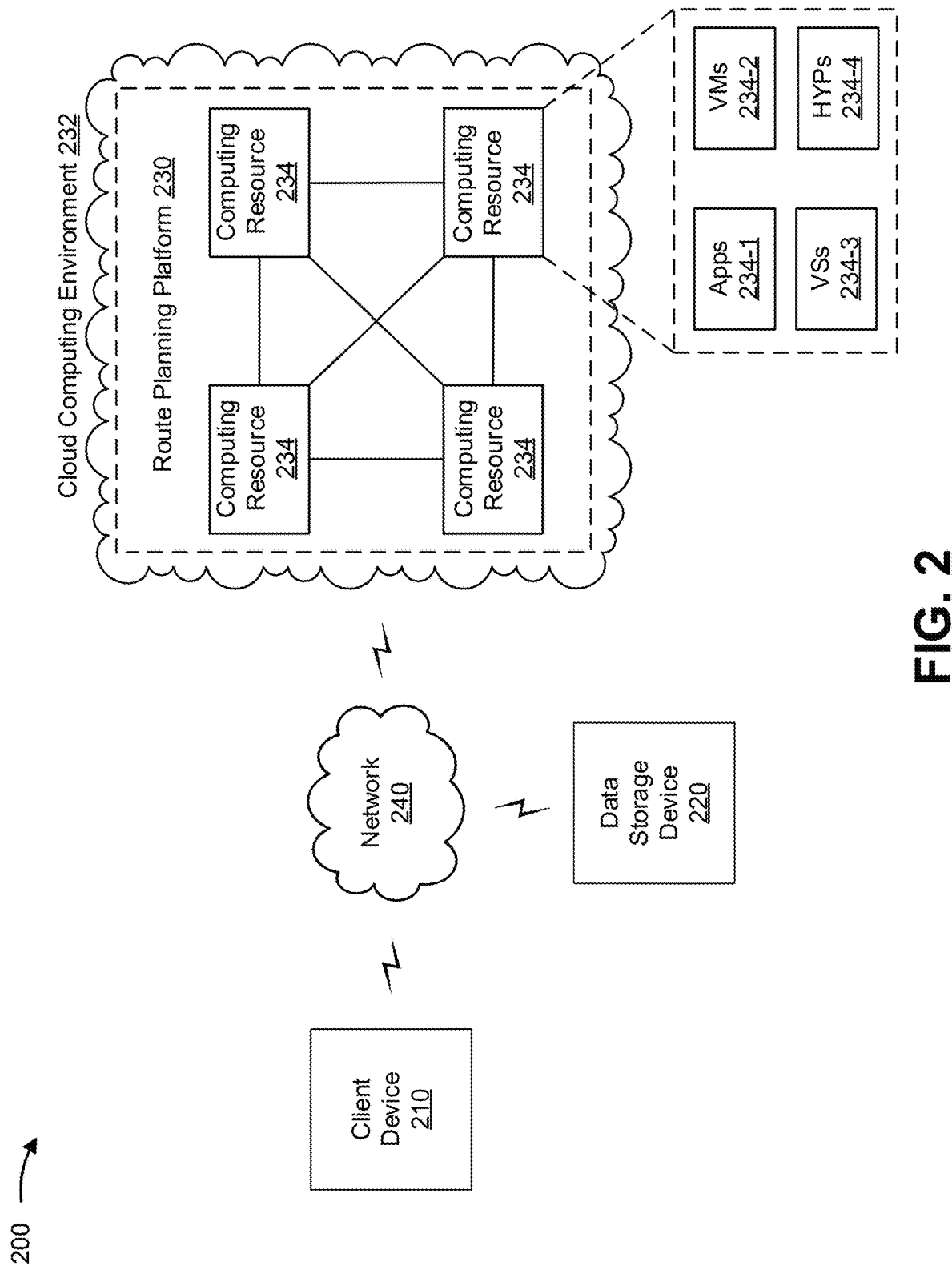
FIG. 2 is a diagram of an example environment in which systems and/or methods described herein can be implemented.

The following detailed description of example implementations refers to the accompanying drawings. The same reference numbers in different drawings can identify the same or similar elements.

Route planning applications often use Dijkstra's algorithm to find a shortest path between nodes in a graph that represents a road network. For example, one approach can be to represent the road network using a graph in which junctions (e.g., intersections, interchanges, and/or the like) are mapped to nodes (sometimes referred to as vertices), and road segments can be mapped to links (sometimes referred to as edges) that can be assigned a cost or a weight based on length, travel time, and/or the like. Accordingly, for a given source node in the graph, Dijkstra's algorithm can find the shortest path between the given source node and every other node in the graph, or alternatively to find the shortest path from the given source node to a specific target node by terminating the algorithm when the shortest path to the specific target node has been determined. For example, assuming that the nodes in the graph represent cities and the costs assigned to the links represent driving distances or driving times between two cities that are connected through a direct road, Dijkstra's algorithm can be used to find the shortest route between one city and all other cities represented in the graph.

Although Dijkstra's algorithm is often used in route planning applications, the basic algorithm is based on graph structures that do not sufficiently model real-world road networks. For example, in the above-mentioned use cases where Dijkstra's algorithm can be used to find the shortest route between one city and all other cities represented in the graph, the costs assigned to the links assume the cities are connected through a direct road that does not have traffic control signals, stop signs, toll roads, traffic delays, and/or the like. Furthermore, finding the shortest path based on link costs does not adequately take turn complexities into account. For example, in regions where vehicles are driven on the right-hand side, making a right turn can be performed faster than making a left turn. Furthermore, left turns can vary with respect to how fast or slow the turns can be performed (e.g., making a left turn at an intersection where a traffic control signal provides a left turn signal might be faster than making a left turn at a stop sign onto a busy crossing street that does not have a stop sign). In another example, road networks often include turn restrictions in which certain turns are disallowed or banned at a given intersection, on a sequence of links spanning multiple road segments, and/or the like).

In general, Dijkstra's algorithm cannot handle turn complexities due to an elimination rule that exists to maintain computational feasibility. More particularly, when used to plan a route from an origin to a destination, Dijkstra's algorithm iteratively expands paths from the origin until the destination is reached. Whenever multiple paths to the same node are found, Dijkstra's algorithm keeps the cheapest path and eliminates all others. This elimination rule is important to maintaining computational feasibility, as the search would otherwise grow until all available memory is exceeded because road networks are often based on map data that can cover many hundreds, thousands, millions, or more road segments and road junctions. Furthermore, the elimination rule can substantially shorten the time needed to compute the shortest path from the origin to the destination. However, as mentioned above, the elimination rule also prevents Dijkstra's algorithm from having the ability to handle turn complexities, which can lead to wasted resources computing paths that cannot be traveled (e.g., because there are one or more restricted or banned turns along the paths), inaccurate paths (e.g., because a first path that appears to be shorter than a second path can actually take more time to travel due to one or more turn costs), and/or the like.

Some implementations described herein utilize a route planning platform that can find a path through a road network that has one or more turn complexities. For example, the turn complexities can include one or more turn costs that depend on a direction in which a given junction is traversed (e.g., turning left at an intersection can be associated with a higher cost than turning right, crossing a road at an intersection can be associated with a higher cost than turning right and a lower cost than turning left, and/or the like). In another example, the turn complexities can include one or more turn restrictions that prohibit or ban a particular turn or set of turns (e.g., disallowed U-turns, disallowed left turns on certain days or at certain times, and/or the like).

In some implementations, in order to handle the one or more turn complexities, the route planning platform can identify, within a graph representing a road network, a subnetwork that corresponds to a restricted area. For example, the subnetwork that corresponds to the restricted area can include links that are either on a turn restriction or a threshold number of links away from entering the turn restriction. Within the subnetwork that corresponds to the restricted area, the route planning platform can compute a set of shortest paths between border links using an exhaustive search and replace the subnetwork in the full road network with the set of shortest paths computed using the exhaustive search. Accordingly, the route planning algorithm can then run Dijkstra's algorithm in the normal manner on the modified full road network, using the set of shortest paths that were calculated using the exhaustive search to optimally tunnel through the restricted area.

Additionally, or alternatively, the route planning platform can handle the one or more turn complexities using an optimized elimination rule. For example, as mentioned above, Dijkstra's algorithm conventionally employs an elimination rule in which a first path eliminates a second path when both paths arrive at the same node and the first path has a lower cost than the second path. To add the ability to handle turn complexities, the optimized elimination rule can be defined such that a first path eliminates a second path when a set of conditions are satisfied. For example, the set of conditions can include a first condition that is satisfied when the first path and the second path arrive at the same node through the same link. Furthermore, the set of conditions can include a second condition that is satisfied when the first path has the same or a lower cost than the second path and a third condition that is satisfied when a set of active restrictions on the first path is a subset of or equal to a set of active restrictions on the second path. Accordingly, under the optimized elimination rule, the first path can eliminate the second path when the set of conditions (e.g., the first, second, and third conditions) are satisfied.

For example, including the first condition whereby the first path can eliminate the second path only if both paths arrive at the same node through the same link can allow the route planning platform to consider turn costs by verifying that both paths turn into the final node from the same set of one or more links. Furthermore, the second condition whereby the first path can eliminate the second path when a cost of the first path is less than or equal to the second path allows for representing costs of turn complexities and allows a first path to eliminate another path having an equivalent cost when the first path is less restricted. Furthermore, the third condition whereby the first path can eliminate the second path only if a set of active restrictions on the first path is a subset of or equal to a set of active restrictions on the second path can prevent a more restricted path from eliminating a less restricted path, as the more restricted path is not guaranteed to be better (and in some cases can be prohibited altogether) due to the restrictions. For example, a first path can be considered more restricted than a second path when the first path has an active turn restriction that does not exist on the second path.

In this way, by implementing one or more approaches to handle turn complexities (e.g., turn costs, turn restrictions, and/or the like), the route planning platform can conserve various computing resources (e.g., processor resources, memory resources, storage resources, communication resources, and/or the like) by avoiding expansion of a search to cover paths that might be prohibited, paths that might be sub-optimal due to turn costs, and/or the like. Furthermore, in the approach mentioned above in which an exhaustive search is performed to find a set of shortest paths within a subnetwork that corresponds to a restricted area, constraining the exhaustive search to the subnetwork and using Dijkstra's algorithm for the rest of the search can allow the route planning platform to evaluate every potential path using brute force (guaranteeing that the optimal path is found) without exceeding bounds on computational feasibility as would likely occur if the exhaustive search was performed on a large-scale road network. In the case of the optimized elimination rule, computing resources can be conserved by eliminating paths that have a higher turn cost, more turn restrictions, and/or the like, and accuracy can be improved by preserving paths that have a lower turn cost, fewer turn restrictions, and/or the like.

FIGS. 1A-1E are diagrams of one or more example implementations 100 described herein. As will be described in further detail herein, example implementation(s) 100 can include a route planning platform that can identify an optimal path through a road network that has one or more turn complexities. In some implementations, the route planning platform can communicate with a data storage device (e.g., to obtain map data that corresponds to the road network, indicates the one or more turn complexities in the road network, and/or the like). In some implementations, the route planning platform can further communicate with a client device (e.g., to provide information related to an optimal path that accounts for turn complexities between an origin location and a destination location based on a request from the client device).

As shown in FIG. 1A, the route planning platform can model various turn complexities (e.g., turn costs, turn restrictions, and/or the like) that might affect a total cost to travel along a given path through a road network, affect whether a given path through a road network is allowed or disallowed, and/or the like. As shown in FIG. 1B, the route planning analytics platform can find a shortest path through the road network based on the turn complexities (e.g., selecting a cheapest path that avoids a turn restriction, selecting a cheapest path taking into account additional costs that might be incurred at one or more turns, and/or the like). For example, as shown in FIG. 1C, the route planning platform can perform an exhaustive search to identify a set of shortest paths through a subnetwork that includes one or more turn complexities and replace the subnetwork in a full road network with the set of shortest paths identified using the exhaustive search. As shown in FIGS. 1D-1E, the route planning platform can additionally, or alternatively, apply an optimized elimination rule in which a first path eliminates a second path when the first path and the second path arrive at a common node through a common set of last nodes, the first path arrives at the common node with a cost that is less than or equal to a cost of the second path, and a set of active restrictions on the first path is a subset of or equal to a set of active restrictions on the second path.

As shown in FIG. 1A, and by reference number 110, the route planning platform can model one or more turn complexities in a road network. In some implementations, the route planning platform can obtain map data related to the road network (e.g., from the data storage device) and use the map data to generate a suitable graph that represents the road network. For example, in some implementations, the graph can include various links that represent road segments (e.g., a portion of a road, a street, a highway, an alleyway, a ramp, and/or the like) and various nodes that represent junctions where two or more road segments meet. For example, the junctions represented by the various nodes can include intersections where road segments meet or cross at-grade (e.g., T-junctions, forks, crossroads, multi-point intersections, and/or the like) and/or interchanges where road segments pass above and/or below one another (e.g., using grade separation, slip roads, and/or the like). In general, a practical road network can be designed in various ways, which can result in variations in the turn complexities that can exist within any given road network.

For example, as further shown in FIG. 1A, reference number 112 illustrates an example road network that includes turn costs at a junction that corresponds to a four-way intersection or crossroads where various road segments meet. Assuming that the junction is in a region where the convention is to drive on the right-hand side of the road, making a right turn to travel along path {A, B, C} can be faster than making a left turn to travel along path {A, B, E}. Furthermore, crossing the intersection to travel along path {A, B, D} can be slower than making the right turn, but faster than making the left turn. Accordingly, when modeling the turn complexities in the road network shown by reference number 112, the route planning platform can assign a low cost to the right turn, a higher cost to crossing the intersection, and a highest cost to the left turn. Furthermore, these costs can vary depending on various other factors, such as a probability that pedestrians, cyclists, and/or the like are present, whether the junction provides a left turn signal, times when there is more or less traffic, and/or the like. For example, in some cases, making a left turn might be faster than going straight across an intersection (e.g., where there are two turn lanes) because turning left allows for merging with traffic traveling in one lane whereas going straight across might require a larger gap in traffic.

In another example, as further shown in FIG. 1A, reference number 114 illustrates an example road network that includes one or more turn restrictions. In particular, the road network shown by reference number 114 includes a disallowed U-turn that includes a sequence of multiple consecutive links. In the illustrated example, the path {A, B, C, D} is disallowed due to the turn restriction banning or otherwise prohibiting the U-turn, but the path {A, B, C, E} is permitted. Furthermore, combining the turn restrictions with the turn costs, the path {A, B, F} can be modeled as faster than path {A, B, C, E}, as described above.

In some implementations, as noted above, real-world road networks can have various designs, including variations from region to region, which can result in variations in the turn complexities that can exist within any given road network. For example, making a left turn would be faster than making a right turn in a region where the convention is to drive on the left-hand side. In other examples, turn complexities can depend on whether a given junction is an uncontrolled intersection without signs or signals, priority or right-of-way rules that apply in a given region, whether a sign-controlled intersection uses a "yield" or "stop" sign, whether a signal-controlled intersection provides a dedicated turn signal, and/or the like. In still other examples, turn complexities can depend on lane designs, such as whether a junction has an advanced stop line that permits certain vehicles (e.g., bicycles) a head start when a light changes from red to green, whether a road network includes a quadrant roadway that adds two three-way intersections to a four-way intersection to move turns off the main intersection, whether the junction has a slip lane that allows vehicles to turn without entering the junction and interfering with traffic, and/or the like. Furthermore, in some cases, certain turns can be restricted at certain times (e.g., no left turns during specific times when there is usually more traffic), have a cost that varies at different times (e.g., a higher cost during high-traffic periods), and/or the like.

Accordingly, in some implementations, the route planning platform can model the turn complexities in a given road network based on various factors. The modeled turn complexities can be represented as weights that can be assigned to a set of nodes such that the turn complexities can be considered when the route planning platform computes the shortest path through a road network that has one or more turn complexities. For example, in some implementations, the weight assigned to a particular set of nodes can depend on the cost to make a turn at the junction represented by the particular set of nodes, which can further depend on a path that is taken through the set of nodes. For example, in the road network shown by reference number 112, the node labeled 'B' can be assigned a low cost when path {A, B, C} is taken, a higher cost when path {A, B, D} is taken, and a highest cost when path {A, B, E} is taken. Furthermore, to handle turn restrictions that are prohibited or otherwise banned, an infinite weight or another suitably large weight can be used (e.g., in the road network shown by reference number 114, an infinite weight or another suitably large weight can be assigned to making a left at the node labeled 'C' when traveling the path {A, B, C, D}).

In some implementations, the turn complexities for a given set of nodes can be modeled statically, dynamically, probabilistically, and/or the like. For example, a turn complexity can be modeled statically with a fixed cost that can be dependent on how geometry, types of road segments, types of junctions, and/or the like introduce turning delays or speed limitations (e.g., based on a maximum velocity with which a turn can be made, a need to watch out for pedestrians, cyclists, and/or other vehicles, and/or the like). In another example, turn complexities can be modeled dynamically with a cost that varies at different times based on turn restrictions that change over time, traffic variations, and/or the like. In some cases, turn complexities can be dynamic dependent on a vehicle (e.g., for a large vehicle such as a truck or a bus, a right turn can be more problematic than a left turn because the vehicle has less space in which to turn). In still another example, certain turn complexities can be modeled probabilistically with a cost that depends on a statistical likelihood that one or more events delaying or prohibiting a turn will occur.

As shown in FIG. 1B, and by reference number 116, the route planning platform can find a shortest path through a road network based on one or more turn complexities in the road network. For example, reference number 118 illustrates an example road network without any turn complexities, which can generally be solved using Dijkstra's algorithm in the conventional manner. In particular, to solve a particular road network (e.g., finding a shortest path from an origin node to all other nodes or to a particular destination node), Dijkstra's algorithm typically expands paths from the origin node in an iterative manner until the destination node has been reached. When multiple paths to the same node (e.g., the destination node or an intermediate node between the origin node and the destination node) are found, Dijkstra's algorithm maintains the cheapest path and eliminates all other paths. In this way, the elimination rule maintains computational feasibility, as the search would otherwise grow until all available memory is exceeded since real-world road networks typically contain hundreds, thousands, millions, or more nodes.

In FIG. 1B, reference number 118 illustrates a simple road network where costs assigned to links are shown as numbers next to each link, and the dotted lines show paths that are eliminated using Dijkstra's algorithm. For example, among two paths that start at the origin node and arrive at the node labeled 'D', a first path {A, D} has a total cost of three and a second path {C, D} has a total cost of two, which results in Dijkstra eliminating the first path. In a similar respect, among two paths that start at the origin node and arrive at the node labeled 'B', a first path {A, B} has a total cost of two and a second path {C, B} has a total cost of three, which results in Dijkstra eliminating the second path. This leaves two possible paths from the origin node to the destination node, including a first path that traverses intermediate nodes 'A' and 'B' for a total cost of four and a second path that traverses intermediate nodes 'C' and 'D' for a total cost of five. Accordingly, of the two remaining paths that arrive at the destination node, Dijkstra's algorithm eliminates the second path that traverses intermediate nodes 'C' and 'D' due to the highest cost, leaving the first path that traverses intermediate nodes 'A' and 'B' as the cheapest (or shortest) path. In this way, Dijkstra can iteratively expand paths from the origin node until the destination node is reached, eliminating all paths except the cheapest path when there are multiple paths that arrive at the same node. Notably, when the road network does not have any turn complexities, the shortest path found using the route planning platform can be the same as the shortest path that would be found using the conventional Dijkstra's algorithm.

As further shown in FIG. 1B, reference number 120 illustrates an example road network that includes a left turn restriction. In this case, the elimination rule employed in the conventional Dijkstra's algorithm would prevent Dijkstra from accurately finding the shortest path through the road network. For example, in the road network illustrated by reference number 120, the dotted path has a total cost of two and the solid path has a total cost of four, which would result in Dijkstra eliminating the solid path because both paths arrive at the same node. However, the optimal path to the destination node has to follow the solid path to avoid the left turn restriction. In a similar respect, reference number 122 illustrates an example road network that includes a U-turn restriction. In this case, the elimination rule employed in the conventional Dijkstra's algorithm would again prevent Dijkstra from accurately finding the optimal path through the road network. For example, in the road network illustrated by reference number 122, the dotted path has a total cost of six and the solid path has a total cost of eight, which would result in Dijkstra eliminating the solid path because both paths arrive at the same destination node. However, the optimal path to the destination node has to follow the solid path to avoid the U-turn restriction. Accordingly, as described in further detail below, the route planning platform can employ one or more approaches to select the cheapest path that avoids the turn restriction(s).

As shown in FIG. 1C, the route planning platform can perform an exhaustive search to identify a set of shortest paths through a subnetwork that includes one or more turn complexities such that the subnetwork can be replaced in a full road network with the set of shortest paths identified using the exhaustive search. For example, an exhaustive search can generally involve evaluating every potential path using brute force, which will always find the optimal path. However, the exhaustive search can consume substantially more memory resources, processing resources, and/or the like relative to using the elimination rule in Dijkstra's algorithm. While applying an exhaustive search can be computationally infeasible in a large-scale road network that can include many hundreds, thousands, millions, or more potential paths, in some implementations, a relatively limited exhaustive search can be performed on a small road network and/or subnetwork while using Dijkstra's algorithm for the rest of the search.

For example, as shown in FIG. 1C, and by reference number 124, the route planning platform can identify, within a road network, a subnetwork that includes a restricted area. The subnetwork that includes the restricted area can be identified as a set of links within the road network that are within a threshold distance (e.g., a quantity of links) away from a turn complexity. For example, in a case where the threshold distance is one, the subnetwork that includes the restricted area can be identified as a set of links that are either on a turn complexity (e.g., zero links away from the turn complexity) or one link away from entering the turn complexity. In this way, by choosing a smaller value for the threshold distance, the size of the restricted area subnetwork can be limited, which can improve performance when subsequently performing the exhaustive search (e.g., conserving memory, processor, and/or other computing resources). Furthermore, by increasing the value for the threshold distance, the exhaustive search can be more accurate by accounting for more possible paths through the restricted area.

As further shown in FIG. 1C, and by reference number 126, the road network includes a turn complexity corresponding to a left turn restriction that prohibits or otherwise bans making a left turn at a particular node. Accordingly, assuming a threshold distance of one, the restricted area can be defined as shown in FIG. 1C. In particular, the restricted area includes three links that are directly connected to the particular node where the left turn is prohibited, and also includes two links that are one link away from entering one of the links that leads to the left turn restriction. Notably, the restricted area does not include the link that is directly connected to the destination node. This is because the left turn restriction applies only when traveling in a direction from the origin node to the destination node (e.g., the final link leading to the destination node is one link away from exiting the turn restriction, and the turn restriction does not apply in the reverse direction when traveling from the destination node to the origin node).

As further shown in FIG. 1C, and by reference number 128, the route planning platform can find, within the subnetwork that includes the restricted area, a set of shortest paths between all border links using an exhaustive search. In particular, a border link can generally correspond to a link that enters and/or exits the restricted area.

For example, as further shown in FIG. 1C, and by reference number 130, the restricted area includes a first border link coupled to the origin node and a second border link coupled to the destination node. Accordingly, in this example, there are two border links, which results in the exhaustive search finding two shortest paths. Notably, if there were more than two border links, there would be a larger number of shortest paths through the restricted area. For example, in general there can be two shortest paths per border link, one in each direction, although in some cases there might be only one shortest path for a given border link (e.g., on a one-way street).

As shown in FIG. 1C, the set of shortest paths found using the exhaustive search includes a first path from the origin node to the destination node, with the first path avoiding the left turn restriction despite having weighted links with a higher sum than the weighted links leading into the left turn restriction. In this case, the exhaustive search can choose the less restricted path despite the weighted links having a greater cost because the exhaustive search would not reach the last node within the restricted area due to the left turn restriction that exists along the alternate path. However, the set of shortest paths also includes a return path from the destination node to the origin node, which follows the path with the link weights amounting to a lower total cost because the turn restriction does not apply in that direction.

As further shown in FIG. 1C, and by reference number 132, the route planning platform can replace, in the full road network, the subnetwork that includes the restricted area with the set of shortest paths calculated using the exhaustive search. In essence, replacing the subnetwork that includes the restricted area with the set of shortest paths can hard-code the optimal paths through the restricted area, collapsing all possible paths within the restricted area into just the set of shortest paths calculated using the exhaustive search. For example, as further shown in FIG. 1C, and by reference number 134, the various nodes and links within the subnetwork that includes the restricted area has been replaced with the first path that avoids the turn restriction when traveling in a direction from the origin node to the destination node, and with the second path that takes the cheaper road segments when traveling in a direction from the destination node to the origin node, as the turn restriction does not apply in the reverse direction.

In some implementations, after having replaced the subnetwork that includes the restricted area with the set of shortest paths, the route planning platform can invoke Dijkstra's algorithm in the normal manner on the full road network. The set of shortest paths calculated using the exhaustive search can be used to essentially tunnel through the restricted area optimally. Furthermore, although the example restricted area shown in FIG. 1C is illustrated and explained above in a context where the turn complexity is a turn restriction that prohibits or otherwise bans a particular left turn in a direction from the origin node to the destination node, it will be appreciated that the same or similar techniques can be applied for other turn complexities. For example, if the turn complexity was a turn cost because left turns are generally modeled as slower than right turns, the exhaustive search can be performed by associating the left turn with a cost that is added to the sum of the weights of the links in a path that takes the left turn.

In some implementations, the exhaustive search described herein can be invoked at runtime as a restricted area is encountered (e.g., by a client device that includes or communicates with the route planning platform) and/or used to precompute the set of shortest paths for one or more restricted areas in advance of encountering the restricted area(s). In the former case, invoking the exhaustive search at runtime can conserve various computing resources (e.g., processor resources, memory resources, communication resources, and/or the like), as the set of shortest paths are computed only when needed. In the latter case, precomputing the set of shortest paths for one or more restricted areas in advance can offer performance improvements at runtime, as the road network has already been prepared. Accordingly, whether the exhaustive search is performed at runtime or in advance can offer trade-offs in resource usage, performance, and/or the like depending on the needs of a particular implementation. Furthermore, when the exhaustive search is performed at runtime, performance can be improved and computing resources can be conserved by initiating the exhaustive search from only the border nodes that Dijkstra's algorithm encounters, rather than all border nodes (e.g., when traveling in a direction from the origin node to the destination node, the exhaustive search would calculate a shortest path in a direction from the origin node to the destination node only without also calculating a shortest path in a reverse direction).

As shown in FIGS. 1D-1E, the route planning platform can additionally, or alternatively, apply an optimized elimination rule in which a first path eliminates a second path when the first path and the second path arrive at a common node through a common set of last nodes, the first path arrives at the common node with a cost that is less than or equal to a cost of the second path, and a set of active restrictions on the first path is a subset of or equal to a set of active restrictions on the second path. For example, Dijkstra's algorithm conventionally applies an elimination rule in which a first path eliminates a second path if the first path arrives at the same node as the second path with a lower cost. In some implementations, the optimized elimination rule applied by the route planning platform can modify the conventional elimination rule to handle turn complexities. For example, in the optimized elimination rule, a first path can eliminate a second path if the first path arrives at the same node as the second path through a common set of last nodes with a lower or equal cost and with a set of active restrictions that is a subset of or equal to a set of active restrictions on the second path.

In some implementations, the additional condition whereby the first path can eliminate the second path only if the first path and the second path arrive at the same node through a common set of last nodes verifies that the final N nodes of both paths are the same, where N is greater than or equal to two. For example, where N has a value of two, this additional condition effectively verifies that both paths enter the final node from the same link. Increasing the value for N (e.g., to three or more) would allow the elimination rule to handle more complicated turn complexities (e.g., turn complexities that span a sequence of several road segments). Furthermore, the additional condition whereby the first path can eliminate the second path only if a set of active restrictions on the first path is a subset of or equal to a set of active restrictions on the second path a more restricted path from eliminating a less restricted path, as the more restricted path cannot be guaranteed to be better than the less restricted path in all cases. In this case, a more restricted path can be defined as a path that has one or more active restrictions that do not exist on another path.

Accordingly, as shown in FIG. 1D, and by reference number 136, the route planning platform can determine, among multiple paths that arrive at the same node, a set of active restrictions for each path. In some implementations, for each path, the set of active restrictions can contain any turn restrictions that the path has only partially completed (e.g., the set of active restrictions can exclude completed turn restrictions, turn restrictions that the path has moved away from, and/or the like). For example, as further shown in FIG. 1D, and by reference numbers 138 and 140, the set of active restrictions for the dotted paths is $\{R_1\}$ because the dotted paths have started to make the restricted U-turn but have not completed the restricted U-turn. In a contrasting example, as further shown in FIG. 1D, and by reference number 142, the set of active restrictions for the dotted paths is an empty set { } (or "Ø") because the restricted U-turn has already been completed. In another example, as further shown in FIG. 1D, and by reference number 144, the set of active restrictions for the dotted paths is the empty set { } because the path has moved off (turned away from) the restricted U-turn.

As shown in FIG. 1E, and by reference number 146, the route planning platform can eliminate, among multiple paths that arrive at the same final node, one or more paths that arrive at the same node through the same link(s) with an equal or greater cost and more active restrictions. As further shown in FIG. 1E, and by reference number 148, the route planning platform can select a shortest remaining path that arrives at the final node.

When applying the optimized elimination rule with respect to a first path that arrives at the same node as a second path through the same link and with an equal or lesser cost than the second path, the route planning platform may eliminate the second path only if a set of active restrictions on the first path is a subset of or equal to a set of active restrictions on the second path. For example, if the first path has three active restrictions $\{R_1, R_2, R_3\}$ and the second path has four active restrictions $\{R_2, R_3, R_4, R_5\}$, the first path cannot eliminate the second path (even if the first path has a lower cost and/or fewer total restrictions than the second path) because the set of active restrictions on the first path includes $R_1$, which is not in the set of active restrictions on the second path. Because $R_1$ is still active (e.g., has not been completed), the first path could continue and eventually encounter $R_1$, which is disallowed, meaning that there is a possibility that the second path will be better than the first path because the first path cannot be used. To clarify, assuming that a first set of active restrictions includes $\{R_1, R_2, R_3\}$, the first set of active restrictions is equal to the set $\{R_1, R_2, R_3\}$, a subset of the set $\{R_1, R_2, R_3, R_4\}$, and not a subset of the set $\{R_2, R_3, R_4, R_5\}$.

As further shown in FIG. 1E, and by reference number 150, the optimized elimination rule can be applied in an example road network includes multiple paths that arrive at the node labeled 'B', including a first path $\{F, D, C, B\}$ that has a U-turn restriction and a second path $\{F, E, C, B\}$ that avoids the U-turn restriction. The elimination rule conventionally used in Dijkstra's algorithm would eliminate the second path because the weighted links for the first path have a lower total cost than the second path (e.g., in the illustrated example, the first path has a total cost of four and the second path has a total cost of six). The optimized elimination rule can keep the second path that avoids the U-turn restriction despite the first path having a lower cost than the second path because the set of active restrictions for the first path include $\{R_1\}$ and the set of active restrictions for the second path is empty. In other words, the first path cannot eliminate the second path because the first path has an active restriction that does not exist on the second path, meaning that the set of active restrictions on the first path is neither a subset of nor equal to a set of active restrictions on the second path. In some implementations, although the second path might not eliminate the first path because of the higher cost, the route planning platform can eventually eliminate the first path because the first path cannot arrive at the destination node due to the U-turn restriction. Additionally, or alternatively, the U-turn restriction can be modeled as a turn cost (e.g., having an infinite weight, a weight with a substantially high value, and/or the like), in which case the second path can eliminate the first path because both paths arrive at the same node through link $\{C, B\}$, the second path has a lower cost than the first path, and the (empty) set of active restrictions on the second path is a subset of the set of active restrictions on the first path.

As further shown in FIG. 1E, and by reference number 152, another example road network has multiple paths that arrive at the node labeled 'B', including a first path $\{E, C, B\}$ that has a left turn cost and a second path $\{E, D, B\}$ that avoids the left turn cost. In this case, the elimination rule conventionally used in Dijkstra's algorithm would eliminate the second path because the weighted links for the first path have a lower total cost than the second path (e.g., in the illustrated example, the first path has a total cost of two and the second path has a total cost of four). The optimized elimination rule can keep the second path that avoids the left turn cost because the first path and the second path arrive at the node labeled 'B' through different sets of last nodes. For example, as shown, the first path arrives at the node labeled 'B' through node 'C' and the second path arrives at the node labeled 'B' through node 'D', which allows the route planning platform to select the shortest path that avoids the expensive left turn cost. For example, when selecting the shortest remaining path, the route planning platform can add the left turn cost to the total cost of the weighted links making up the first path, which results in the first path having a total cost of twelve and the second path being the shortest remaining (uneliminated) path with a total cost of four.

As indicated above, FIGS. 1A-1E are provided as one or more examples. Other examples can differ from what is described with regard to FIGS. 1A-1E.

FIG. 2 is a diagram of an example environment 200 in which systems and/or methods described herein can be implemented. As shown in FIG. 2, environment 200 can include a client device 210, a data storage device 220, a route planning platform 230 hosted within a cloud computing environment 232 that includes a set of computing resources 234, and a network 240. Devices of environment 200 can interconnect via wired connections, wireless connections, or a combination of wired and wireless connections.

Client device 210 includes one or more devices capable of receiving, generating, storing, processing, analyzing, and/or providing information associated with an optimal path through a road network that has one or more turn complexities. For example, client device 210 can include a computer (e.g., a desktop computer, a laptop computer, a tablet computer, a handheld computer, a server device, etc.), a mobile phone (e.g., a smart phone, a radiotelephone, etc.), an internet of things (IoT) device or smart appliance, a personal navigation device, or a similar device. In some implementations, client device 210 can receive information from and/or transmit information to data storage device 220, route planning platform 230, and/or the like. For example, client device 210 can transmit a request for a path from an origin location to a destination location to data storage device 220, route planning platform 230, and/or the like. Client device 210 can receive, from data storage device 220, route planning platform 230, and/or the like, information relating to an optimal path from the origin location to the destination location, which can consider one or more turn costs, turn restrictions, and/or other turn complexities in one or more potential paths from the origin location to the destination location.

Data storage device 220 includes one or more devices capable of storing, processing, and/or routing information (e.g., map data that corresponds to one or more road networks, indicates turn complexities that exist within the one or more road networks, and/or the like). For example, in some implementations, data storage device 220 can include a server device, a hard disk device, an optical disk device, a solid-state drive (SSD), a compact disc (CD), a network attached storage (NAS) device, a Flash memory device, a cartridge, a magnetic tape, and/or another device that can store and provide access to map data. In some implementations, data storage device 220 can include a communication interface that allows data storage device 220 to receive information from and/or transmit information to other devices in environment 200, such as client device 210 and/or route planning platform 230.

Route planning platform 230 includes one or more devices capable of receiving, generating, storing, processing, and/or providing information associated with finding an optimal path through a road network that includes one or more turn complexities (e.g., turn costs, turn restrictions, and/or the like along one or more potential paths from an origin node to a destination node). For example, route planning platform 230 can perform an exhaustive search to identify a set of shortest paths through a subnetwork that includes one or more turn complexities and replace the subnetwork in a full road network with the set of shortest paths identified using the exhaustive search, with the set of shortest paths providing an optimal path to tunnel through the subnetwork. Additionally, or alternatively, route planning platform 230 can apply an optimized elimination rule in which a first path eliminates a second path when the first path and the second path arrive at a common node through a common set of last nodes, the first path arrives at the common node with a cost that is less than or equal to a cost of the second path, and a set of active restrictions on the first path is a subset of or equal to a set of active restrictions on the second path.

In some implementations, as shown, route planning platform 230 can be hosted in a cloud computing environment 232. Notably, while implementations described herein describe route planning platform 230 as being hosted in cloud computing environment 232, in some implementations, route planning platform 230 can be non-cloud-based (e.g., can be implemented outside of a cloud computing environment) or partially cloud-based.

Cloud computing environment 232 includes an environment that hosts route planning platform 230. Cloud computing environment 232 can provide computation, software, data access, storage, etc. services that do not require end-user knowledge of a physical location and configuration of system(s) and/or device(s) that host route planning platform 230. As shown, cloud computing environment 232 can include a group of computing resources 234 (referred to collectively as "computing resources 234" and individually as "computing resource 234").

Computing resource 234 includes one or more personal computers, workstation computers, server devices, or other types of computation and/or communication devices. In some implementations, computing resource 234 can host route planning platform 230. The cloud resources can include compute instances executing in computing resource 234, storage devices provided in computing resource 234, data transfer devices provided by computing resource 234, and/or the like. In some implementations, computing resource 234 can communicate with other computing resources 234 via wired connections, wireless connections, or a combination of wired and wireless connections.

As further shown in FIG. 2, computing resource 234 includes a group of cloud resources, such as one or more applications ("APPs") 234-1, one or more virtual machines ("VMs") 234-2, virtualized storage ("VSs") 234-3, one or more hypervisors ("HYPs") 234-4, and/or the like.

Application 234-1 includes one or more software applications that can be provided to or accessed by client device 210, data storage device 220, and/or the like. Application 234-1 can eliminate a need to install and execute the software applications on client device 210, data storage device 220, and/or the like. For example, application 234-1 can include software associated with route planning platform 230 and/or any other software capable of being provided via cloud computing environment 232. In some implementations, one application 234-1 can send information to and/or receive information from one or more other applications 234-1, via virtual machine 234-2.

Virtual machine 234-2 includes a software implementation of a machine (e.g., a computer) that executes programs like a physical machine. Virtual machine 234-2 can be either a system virtual machine or a process virtual machine, depending upon use and degree of correspondence to any real machine by virtual machine 234-2. A system virtual machine can provide a complete system platform that supports execution of a complete operating system ("OS"). A process virtual machine can execute a single program, and can support a single process. In some implementations, virtual machine 234-2 can execute on behalf of a user (e.g., a user of client device 210, data storage device 220, and/or the like), and can manage infrastructure of cloud computing environment 232, such as data management, synchronization, or long-duration data transfers.

Virtualized storage 234-3 includes one or more storage systems and/or one or more devices that use virtualization techniques within the storage systems or devices of computing resource 234. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can provide administrators of the storage system with flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 234-4 can provide hardware virtualization techniques that allow multiple operating systems (e.g., "guest operating systems") to execute concurrently on a host computer, such as computing resource 234. Hypervisor 234-4 can present a virtual operating platform to the guest operating systems, and can manage the execution of the guest operating systems. Multiple instances of a variety of operating systems can share virtualized hardware resources.

Network 240 includes one or more wired and/or wireless networks. For example, network 240 can include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, a core network, and/or the like, and/or a combination of these or other types of networks.

The number and arrangement of devices and networks shown in FIG. 2 are provided as one or more examples. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
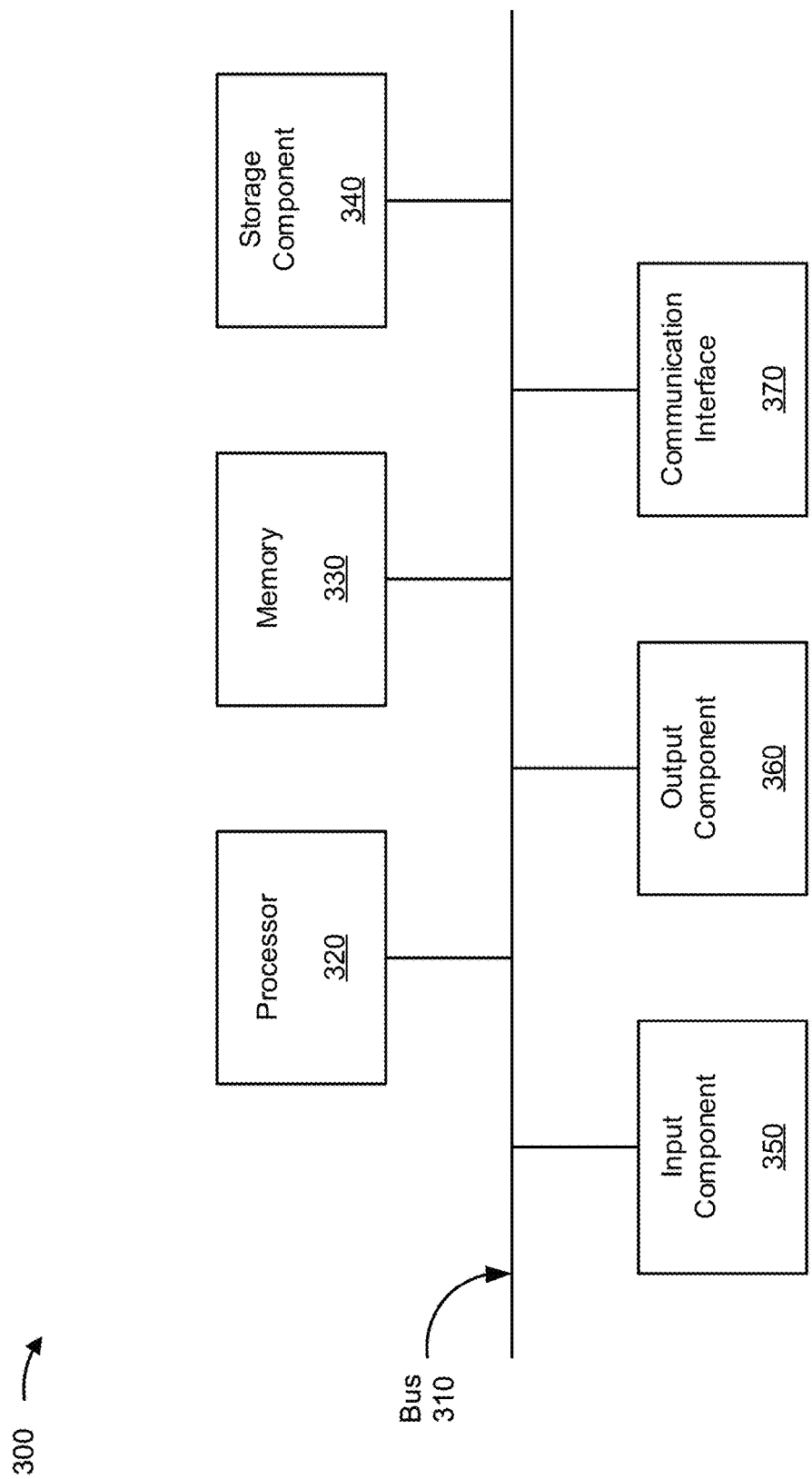
FIG. 3 is a diagram of example components of one or more devices of FIG. 2.

FIG. 3 is a diagram of example components of a device 300. Device 300 can correspond to client device 210, data storage device 220, and/or route planning platform 230. In some implementations, client device 210, data storage device 220, and/or route planning platform 230 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a wireless local area network interface, a cellular network interface, and/or the like.

Device 300 can perform one or more processes described herein. Device 300 can perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardware circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
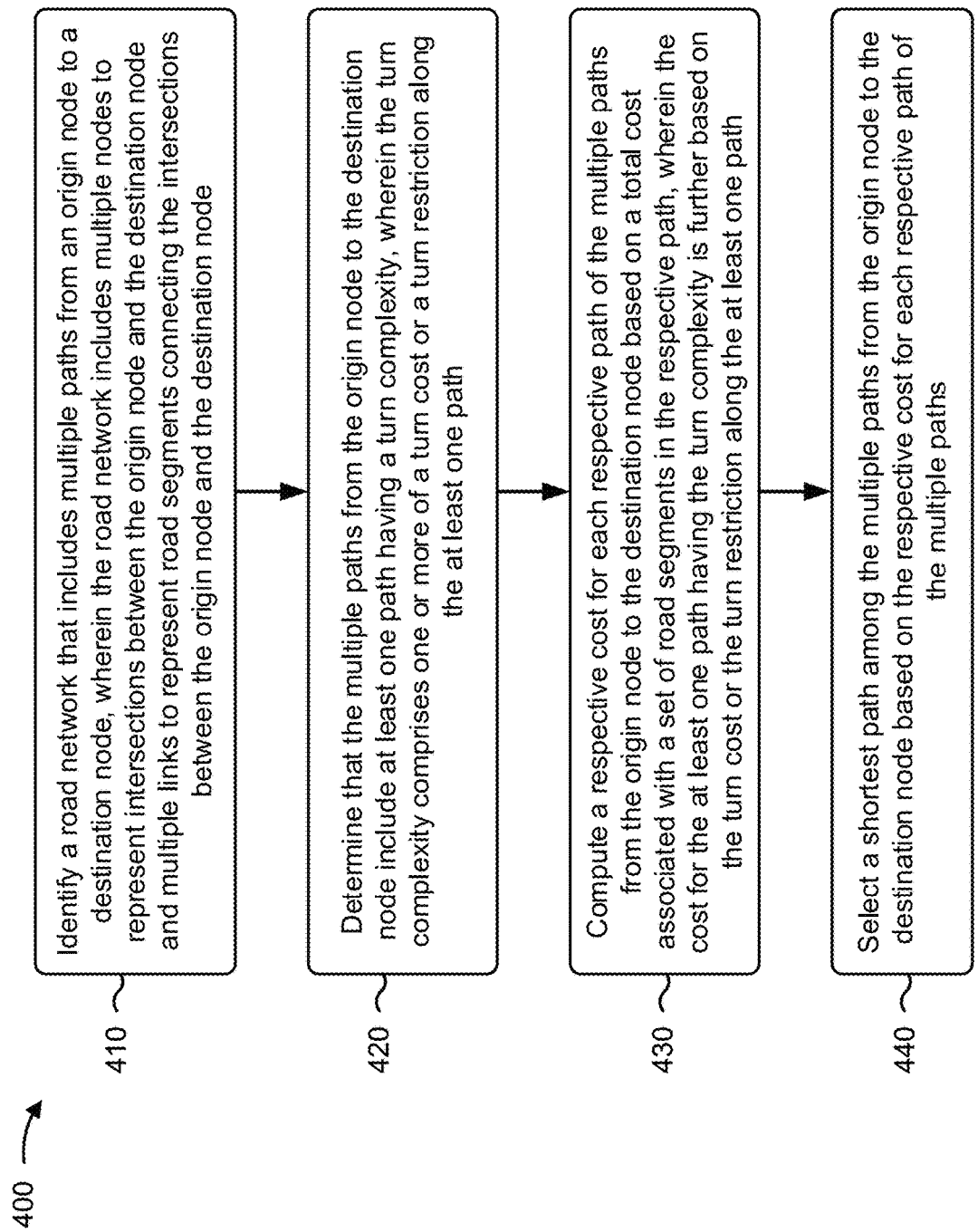
FIG. 4 is a flow chart of an example process for pathfinding through a road network with turn complexities.

FIG. 4 is a flow chart of an example process 400 for pathfinding through a road network with turn complexities. In some implementations, one or more process blocks of FIG. 4 can be performed by a route planning platform (e.g., route planning platform 230). In some implementations, one or more process blocks of FIG. 4 can be performed by another device or a group of devices separate from or including the route planning platform, such as a client device (e.g., client device 210), a data storage device (e.g., data storage device 220), and/or the like.

As shown in FIG. 4, process 400 can include identifying a road network that includes multiple paths from an origin node to a destination node, wherein the road network includes multiple nodes to represent junctions between the origin node and the destination node and multiple links to represent road segments connecting the junctions between the origin node and the destination node (block 410). For example, the route planning platform (e.g., using computing resource 234, processor 320, memory 330, storage component 340, input component 350, output component 360, communication interface 370, and/or the like) can identify a road network that includes multiple paths from an origin node to a destination node, as described above. In some implementations, the road network includes multiple nodes to represent junctions between the origin node and the destination node and multiple links to represent road segments connecting the junctions between the origin node and the destination node.

As further shown in FIG. 4, process 400 can include determining that the multiple paths from the origin node to the destination node include at least one path having a turn complexity, wherein the turn complexity comprises one or more of a turn cost or a turn restriction along the at least one path (block 420). For example, the route planning platform (e.g., using computing resource 234, processor 320, memory 330, storage component 340, input component 350, output component 360, communication interface 370, and/or the like) can determine that the multiple paths from the origin node to the destination node include at least one path having a turn complexity, as described above. In some implementations, the turn complexity comprises one or more of a turn cost or a turn restriction along the at least one path.

As further shown in FIG. 4, process 400 can include computing a respective cost for each respective path of the multiple paths from the origin node to the destination node based on a total cost associated with a set of road segments in the respective path, wherein the cost for the at least one path having the turn complexity is further based on the turn cost or the turn restriction along the at least one path (block 430). For example, the route planning platform (e.g., using computing resource 234, processor 320, memory 330, storage component 340, input component 350, output component 360, communication interface 370, and/or the like) can compute a respective cost for each respective path of the multiple paths from the origin node to the destination node based on a total cost associated with a set of road segments in the respective path, as described above. In some implementations, the cost for the at least one path having the turn complexity is further based on the turn cost or the turn restriction along the at least one path.

As further shown in FIG. 4, process 400 can include selecting a shortest path among the multiple paths from the origin node to the destination node based on the respective cost for each respective path of the multiple paths (block 440). For example, the route planning platform (e.g., using computing resource 234, processor 320, memory 330, storage component 340, input component 350, output component 360, communication interface 370, and/or the like) can select a shortest path among the multiple paths from the origin node to the destination node based on the respective cost for each respective path of the multiple paths, as described above.

Process 400 can include additional implementations, such as any single implementation or any combination of implementations described below and/or in connection with one or more other processes described elsewhere herein.

In some implementations, when selecting the shortest path, the route planning platform can identify, in the road network, a restricted area including a subset of the junctions and a subset of the road segments within a threshold distance from the turn complexity, and identify, using an exhaustive search, a set of shortest paths between border links that enter the restricted area and border links that exit the restricted area. In some implementations, the route planning platform can replace, in the road network, the restricted area with the set of shortest paths between the border links that enter the restricted area and the border links that exit the restricted area. In some implementations, the exhaustive search is performed based on a route planning algorithm encountering one or more of the border links that enter the restricted area.

In some implementations, when selecting the shortest path, the route planning platform can identify, among the multiple paths, a first path that arrives at a particular junction between the origin node and the destination node, wherein the first path is associated with a first set of active restrictions based on uncompleted turn restrictions along the first path, identify, among the multiple paths, a second path that arrives at the particular junction between the origin node and the destination node, wherein the second path is associated with a second set of active restrictions based on uncompleted turn restrictions along the second path, and eliminate the second path based on determining that the first set of active restrictions is a subset of or equal to the second set of active restrictions. In some implementations, the second path is eliminated based on further determining that the first path and the second path arrive at the particular junction between the origin node and the destination node through a common set of last nodes. In some implementations, the common set of last nodes includes two or more junctions between the origin node and the destination node.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

The foregoing disclosure provides illustration and description, but is not intended to be exhaustive or to limit the implementations to the precise form disclosed. Modifications and variations can be made in light of the above disclosure or can be acquired from practice of the implementations.

As used herein, the term "component" is intended to be broadly construed as hardware, firmware, or a combination of hardware and software.

Some implementations are described herein in connection with thresholds. As used herein, satisfying a threshold can, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, and/or the like, depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein can be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features can be combined in ways not specifically recited in the claims and/or disclosed in the specification. Although each dependent claim listed below can directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. A method, comprising:
identifying, by a device, a road network that includes multiple paths from an origin node to a destination node,
wherein the road network includes multiple nodes to represent junctions between the origin node and the destination node and multiple links to represent road segments connecting the junctions between the origin node and the destination node;

determining, by the device, that the multiple paths from the origin node to the destination node include at least one path having a turn complexity that comprises one or more of a turn cost that is based on a turn restriction, along the at least one path, that is associated with at least one of:
- a first turn that is banned, or
- a second turn that is banned on a particular day or at a particular time;

computing, by the device, a respective cost for each respective path of the multiple paths from the origin node to the destination node based on a total cost associated with a set of road segments in the respective path;

selecting, by the device, a shortest path among the multiple paths from the origin node to the destination node based on the respective cost for each respective path of the multiple paths.

2. The method of claim 1, wherein selecting the shortest path comprises:
identifying, among the multiple paths, a first path that arrives at a particular junction between the origin node and the destination node,
   wherein the first path is associated with a first set of active restrictions based on uncompleted turn restrictions along the first path;
identifying, among the multiple paths, a second path that arrives at the particular junction between the origin node and the destination node,
   wherein the second path is associated with a second set of active restrictions based on uncompleted turn restrictions along the second path; and
eliminating the second path based on determining that the first set of active restrictions is a subset of or equal to the second set of active restrictions.

3. The method of claim 2, wherein the second path is eliminated based on further determining that the first path and the second path arrive at the particular junction between the origin node and the destination node through a common set of last nodes.

4. The method of claim 3, wherein the common set of last nodes includes two or more junctions between the origin node and the destination node.

5. The method of claim 1, further comprising:
determining, within a graph associated with representing the road network, a subnetwork that corresponds to a restricted area that includes the turn restriction,
   wherein the restricted area includes links that are associated with at least the turn restriction or a threshold number of links away from entering the turn restriction;
determining a set of shortest paths between border links that enters or exits the restricted area;
replacing the subnetwork with the set of shortest paths; and
wherein the computing the respective cost is further based on the road network including the replaced subnetwork.

6. The method of claim 5, wherein determining the set of shortest paths between the border links comprises performing an exhaustive search based on a route planning algorithm encountering one or more of the border links that enter the restricted area.

7. The method of claim 1, wherein the turn cost is further based on a value that varies at different days or times.

8. A device, comprising:
one or more memories; and
one or more processors communicatively coupled to the one or more memories, to:
   identify a road network that includes multiple paths from an origin node to a destination node,
      wherein the road network includes multiple nodes to represent junctions between the origin node and the destination node and multiple links to represent road segments connecting the junctions between the origin node and the destination node;
   determine that the multiple paths from the origin node to the destination node include at least one path having a turn complexity that comprises one or more of a turn cost that is based on a turn restriction, along the at least one path, that is associated with at least one of:
      a first turn that is banned, or
      a second turn that is banned on a particular day or at a particular time;
   compute a respective cost for each respective path of the multiple paths from the origin node to the destination node based on a total cost associated with a set of road segments in the respective path;
   select a shortest path among the multiple paths from the origin node to the destination node based on the respective cost for each respective path of the multiple paths.

9. The device of claim 8, wherein the one or more processors, when selecting the shortest path, are to:
identify, among the multiple paths, a first path that arrives at a particular junction between the origin node and the destination node,
   wherein the first path is associated with a first set of active restrictions based on uncompleted turn restrictions along the first path;
identify, among the multiple paths, a second path that arrives at the particular junction between the origin node and the destination node,
   wherein the second path is associated with a second set of active restrictions based on uncompleted turn restrictions along the second path; and
eliminate the second path based on determining that the first set of active restrictions is a subset of or equal to the second set of active restrictions.

10. The device of claim 9, wherein the second path is eliminated based on further determining that the first path and the second path arrive at the particular junction between the origin node and the destination node through a common set of last nodes.

11. The device of claim 10, wherein the common set of last nodes includes two or more junctions between the origin node and the destination node.

12. The device of claim 8, wherein the one or more processors are further to:
determine a subnetwork, within the road network, that corresponds to a restricted area that includes the turn restriction,
   wherein the restricted area includes links that are associated with at least the turn restriction or a threshold number of links away from entering the turn restriction;
determine a set of shortest paths between border links that enters or exits the restricted area;
replace the subnetwork with the set of shortest paths; and
wherein the computing the respective cost is further based on the road network including the replaced subnetwork.

13. The device of claim 12, wherein determining the set of shortest paths between the border links comprises performing an exhaustive search based on a route planning algorithm encountering one or more of the border links that enter the restricted area.

14. The device of claim 8, wherein the turn cost is further based on a value that varies at different days or times.

15. A non-transitory computer-readable medium storing instructions, the instructions comprising:
one or more instructions that, when executed by one or more processors, cause the one or more processors to:
identify a road network that includes multiple paths from an origin node to a destination node,
wherein the road network includes multiple nodes to represent junctions between the origin node and the destination node and multiple links to represent road segments connecting the junctions between the origin node and the destination node;
determine that the multiple paths from the origin node to the destination node include at least one path having a turn complexity that comprises one or more of a turn cost that is based on a turn restriction, along the at least one path, that is associated with at least one of:
a first turn that is banned, or
a second turn that is banned on a particular day or at a particular time;
compute a respective cost for each respective path of the multiple paths from the origin node to the destination node based on a total cost associated with a set of road segments in the respective path;
select a shortest path among the multiple paths from the origin node to the destination node based on the respective cost for each respective path of the multiple paths.

16. The non-transitory computer-readable medium of claim 15, wherein the one or more instructions, that cause the one or more processors to select the shortest path, cause the one or more processors to:
identify, among the multiple paths, a first path that arrives at a particular junction between the origin node and the destination node,
wherein the first path is associated with a first set of active restrictions based on uncompleted turn restrictions along the first path;
identify, among the multiple paths, a second path that arrives at the particular junction between the origin node and the destination node,
wherein the second path is associated with a second set of active restrictions based on uncompleted turn restrictions along the second path; and
eliminate the second path based on determining that the first set of active restrictions is a subset of or equal to the second set of active restrictions.

17. The non-transitory computer-readable medium of claim 16, wherein the second path is eliminated based on further determining that the first path and the second path arrive at the particular junction between the origin node and the destination node through a common set of last nodes.

18. The non-transitory computer-readable medium of claim 15, wherein the one or more instructions cause the one or more processors further to:
determine a subnetwork, within the road network, that corresponds to a restricted area that includes the turn restriction,
wherein the restricted area includes links that are associated with at least the turn restriction or a threshold number of links away from entering the turn restriction;
determine a set of shortest paths between border links that enters or exits the restricted area;
replace the subnetwork with the set of shortest paths; and
wherein the computing the respective cost is further based on the road network including the replaced subnetwork.

19. The non-transitory computer-readable medium of claim 18, wherein determining the set of shortest paths between the border links comprises performing an exhaustive search based on a route planning algorithm encountering one or more of the border links that enter the restricted area.

20. The non-transitory computer-readable medium of claim 15, wherein the turn cost is further based on a value that varies at different days or times.

* * * * *